US007050008B2

(12) United States Patent
Saito et al.

(10) Patent No.: US 7,050,008 B2
(45) Date of Patent: May 23, 2006

(54) ANTENNA UNIT AND PORTABLE WIRELESS DEVICE

(75) Inventors: Yuichiro Saito, Tokyo (JP); Ken Ito, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 10/747,093

(22) Filed: Dec. 30, 2003

(65) Prior Publication Data

US 2004/0207558 A1 Oct. 21, 2004

(30) Foreign Application Priority Data

Jan. 21, 2003 (JP) ............................ 2003-012603

(51) Int. Cl.
*H01Q 1/24* (2006.01)
*H04M 1/00* (2006.01)

(52) U.S. Cl. .................................... 343/702; 455/575.3

(58) Field of Classification Search ................ 343/906, 343/916, 882, 702; 292/27, 24; 455/575.1, 455/575.3, 575.7
See application file for complete search history.

(56) References Cited

U.S. PATENT DOCUMENTS 5,218,369 A * 6/1993 Jennings ..................... 343/702
5,576,720 A * 11/1996 Gorenz et al. .............. 343/702
5,617,106 A * 4/1997 Tahmassebpur ............. 343/702
5,973,645 A * 10/1999 Zigler et al. ................ 343/702
6,030,009 A 2/2000 Stalgren et al. ............... 292/27
6,064,342 A * 5/2000 Sandhu et al. .............. 343/702
6,317,085 B1 * 11/2001 Sandhu et al. .............. 343/702
6,653,979 B1 * 11/2003 Au et al. .................... 343/702
2002/0025827 A1 2/2002 Song .......................... 455/500

FOREIGN PATENT DOCUMENTS

JP 9-69714 3/1997
JP 11-340869 12/1999

* cited by examiner

*Primary Examiner*—Trinh V. Dinh
*Assistant Examiner*—Angela M Lie
(74) *Attorney, Agent, or Firm*—Oblon, Spivak, McClelland, Maier & Neustadt, P.C.

(57) ABSTRACT

In a rotatable antenna unit capable of being externally rotated away from and folded in a portable wireless device, an antenna detachment mechanism is provided, the antenna detachment mechanism composed of a bearing for rotatably supporting the antenna unit on the device by inserting therein and holding a pivot axis mounted on the device and an opening formed by cutting a part of the bearing. As a result, when an excessive external force is applied to the antenna unit being in an upright position, the opening is widened and the antenna unit comes off the portable wireless device. This prevents the antenna unit from being broken.

7 Claims, 6 Drawing Sheets

ANTENNA UNIT AND PORTABLE WIRELESS DEVICE

BACKGROUND OF THE INVENTION

1. Field of the Invention

This invention relates to an antenna unit and a portable wireless device, and more particularly, is suitably applied to a portable telephone.

2. Description of the Related Art

There are portable telephones that have rotatable (flip-up) antennae which have a rotation mechanism so as to be folded into the telephones for realizing both of improved antenna gain while used and improved portability while unused. (For example, Japanese Patent Laid Open No. 8-298406).

The flip-up antennae, however, have a problem in that, if such an excessive external force as to rotate the antennae further is applied to the antennae being in an upright position, the antennae, the rotation mechanism or the portable telephone housings may be broken.

SUMMARY OF THE INVENTION

In view of the foregoing, an object of this invention is to provide an antenna unit and a portable wireless device which are capable of preventing breakage of the antenna unit and the portable wireless device housing due to an external force applied to the antenna being in an upright position.

The foregoing object and other objects of the present invention have been achieved by the provision of an antenna unit which is rotatably attached to the housing of a portable wireless device and can be folded in and externally rotated away from the housing. In this antenna unit, an antenna supporting means for rotatably supporting the antenna unit on the housing is provided with an antenna detachment means. This antenna detachment means is composed of a bearing for inserting therein and holding a pivot axis mounted on the housing to rotatably support the antenna unit on the housing, and an opening formed by cutting a part of the bearing, so that when an excessive external force is applied to the antenna unit, the opening is widened and thereby the antenna unit comes off the housing.

In one embodiment of the present invention, an antenna unit is composed of an antenna section containing an antenna element, a supporting section provided at one end of the antenna unit for rotatably supporting the antenna section on the housing of a portable wireless device, and an opening formed by cutting a part of the supporting section so that the antenna section and the supporting section can come off the housing when an excessive external force is applied to the antenna section or the body while the antenna section is in an upright position.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Entire Construction of Portable Telephone

Figure 1:
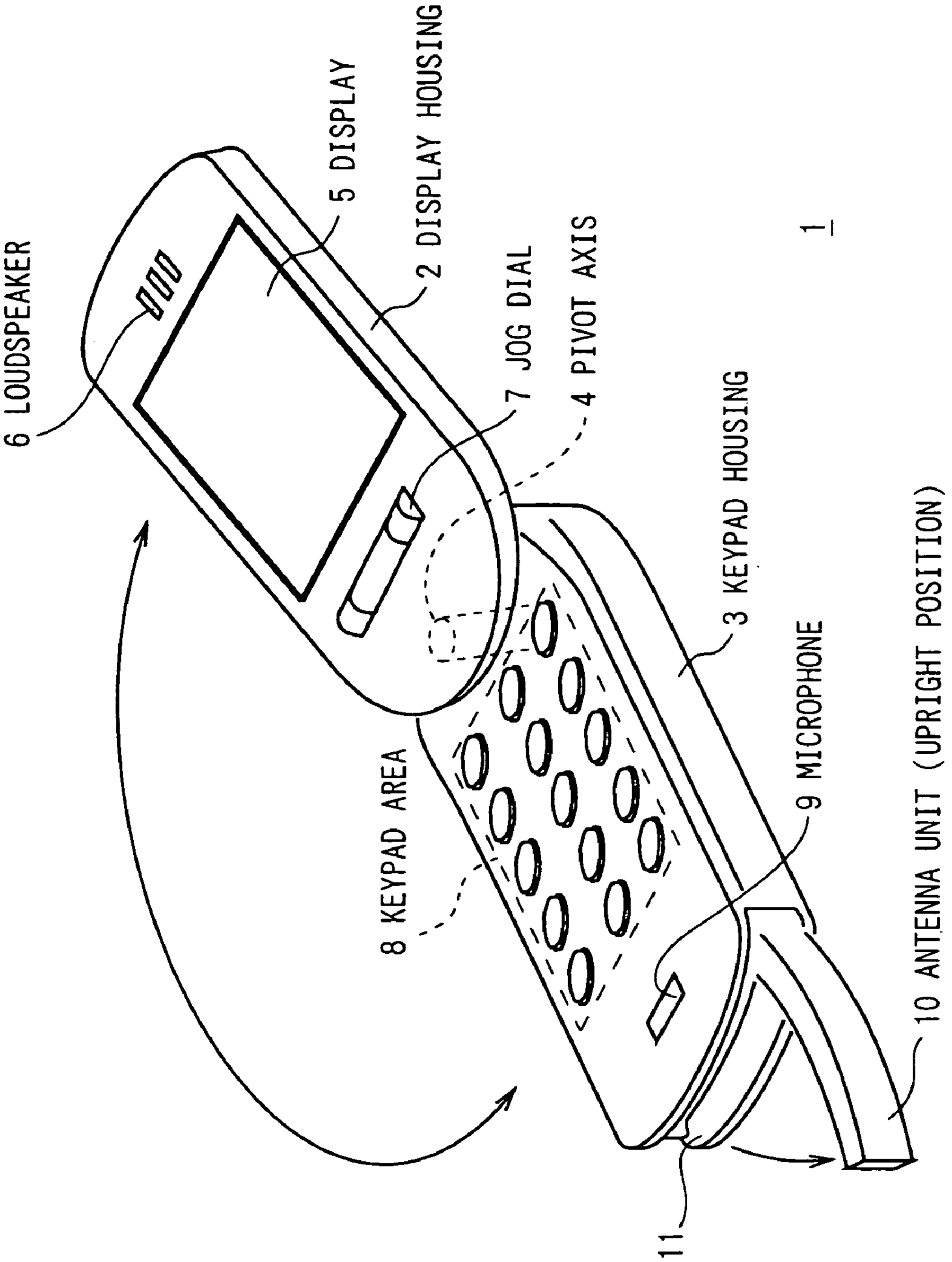
FIG. 1 is a schematic drawing showing the entire construction of a portable telephone of this invention.

Referring to FIG. 1, reference numeral 1 shows a portable telephone as a portable wireless device to which this invention is applied. A display housing 2 and a keypad housing 3 are rotatably connected to each other via a pivot axis 4 mounted on one end of the keypad housing 3, so that the housings 2 and 3 are rotatable between an open state shown in FIG. 1 and a closed state shown in FIG. 2 where the housing 2 sits on the top of the housing 3.

Arranged on the front surface of the display housing 2 are a display 5 comprising a liquid crystal display in its center, a loudspeaker 6 above the display 5, and a jog dial 7 which can be rotated and pressed, below the display 5. On the other hand, arranged on the keypad housing 3 are a keypad area 8 composed of a plurality of buttons in its center and a microphone 9 below the keypad area 8.

In the closed state, the display housing 2 covers the keypad area 8 (FIG. 1) to protect it and prevent enormous operations, and further the portable telephone 1 can become compact and thereby provide improved portability. In addition, even in the closed state, the display 5 and the jog dial 7 are exposed, which allows the portable telephone 1 to be operated with the jog dial 7 while the display 5 is viewed.

Figure 2:
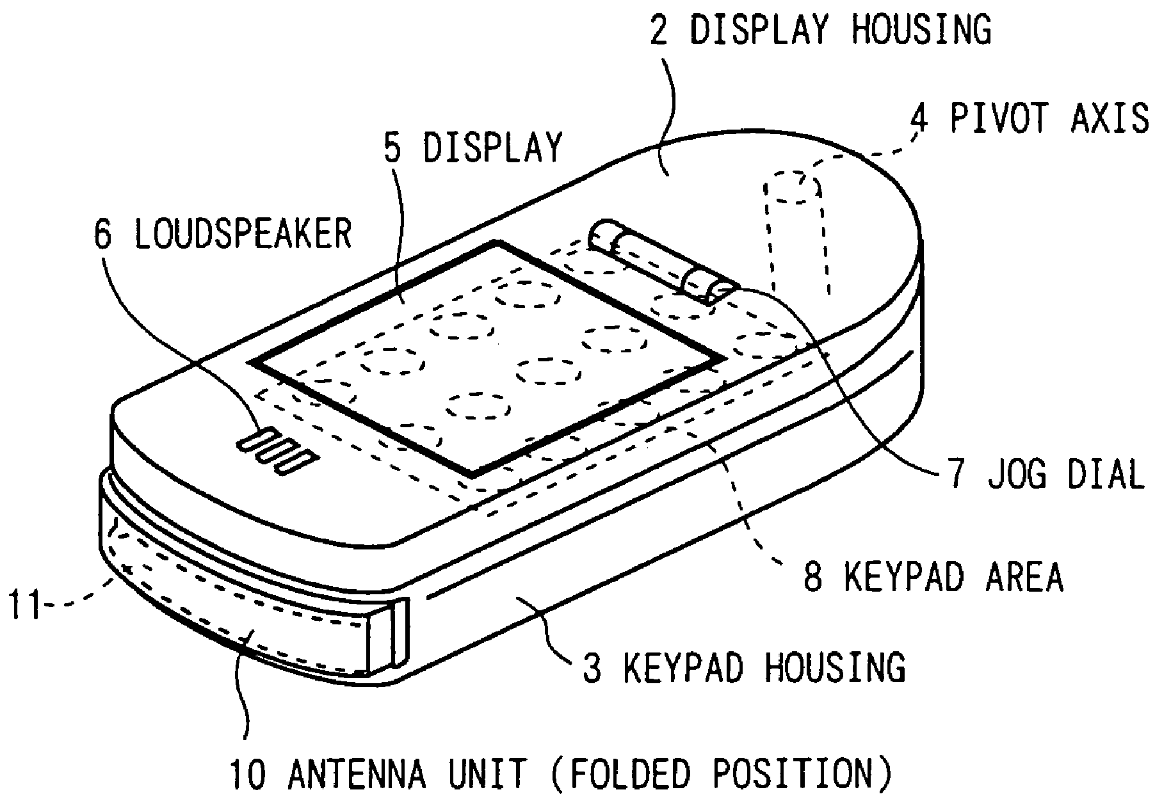
FIG. 2 is a schematic drawing showing the portable telephone that is closed.

In addition to the above construction, an antenna unit 10 is rotatably attached via a pivot axis (not shown) at a bottom side of the keypad housing 3. Flipping up the antenna unit 10 in communication, as shown in FIG. 1, realizes a good communication status with the highest antenna gain. During being carried, the antenna unit 10 is folded in an antenna groove 11 which is formed at the bottom side of the keypad housing 3, as shown in FIG. 2, so that the amount of projecting of the antenna unit 10 from the keypad housing 3 can be minimized, resulting in providing improved portability and strength against breakage.

(2) Antenna Unit and Antenna Groove

Figure 3:
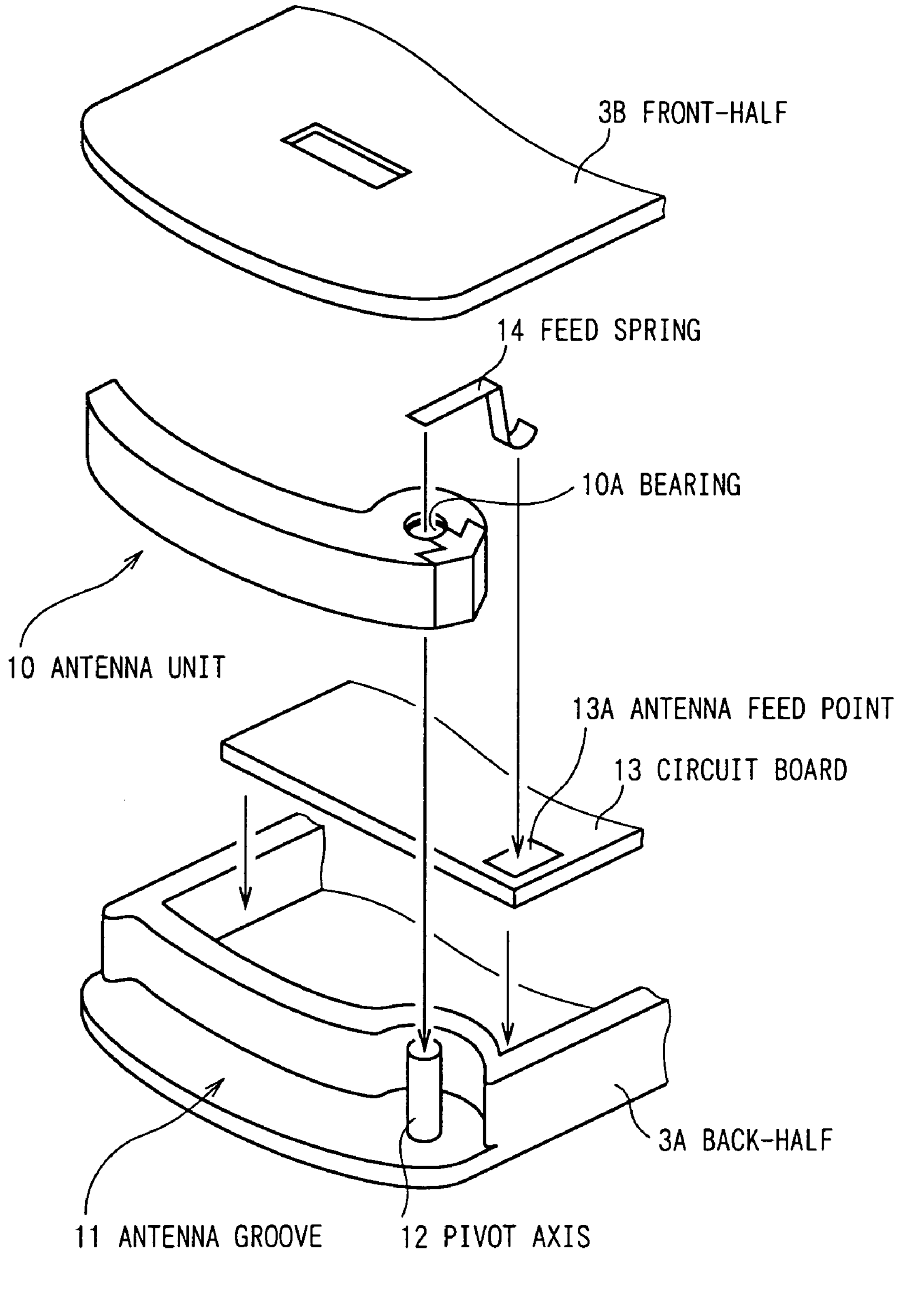
FIG. 3 is a schematic drawing explaining an antenna unit and a pivot axis.

Next, the mechanism of the antenna unit 10 and the antenna groove 11 will be described. As shown in FIG. 3, arranged in the antenna groove 11 is a metal column pivot axis 12.

By inserting the pivot axis 12 into a bearing 10A provided at one end of the antenna unit 10 and then fitting the back-half 3A and the front-half 3B of the keypad housing 3 together, the antenna unit 10 is rotatable about the pivot axis 12 being supported by the bearing 10A.

Figure 4A:
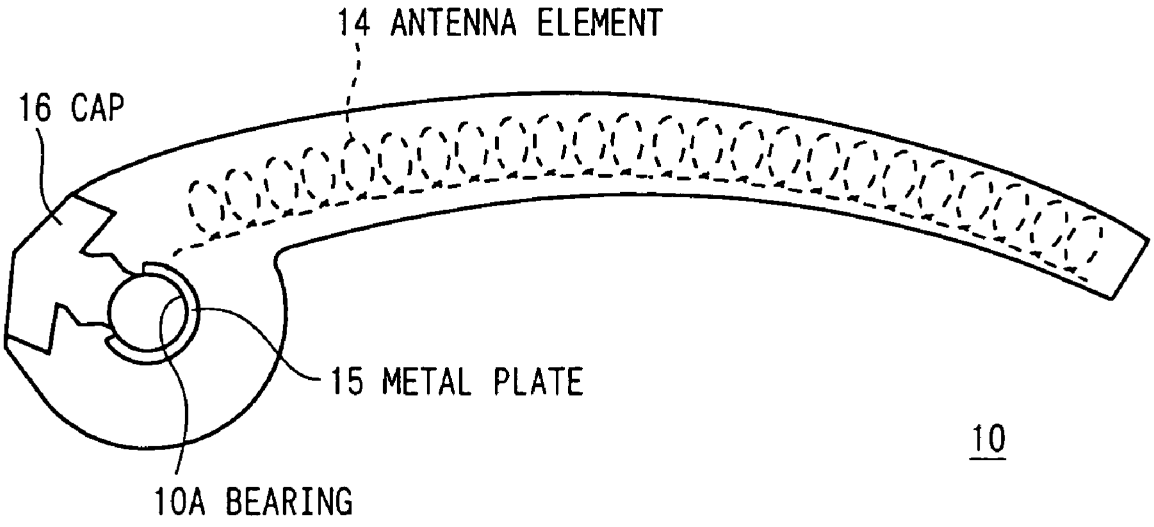
FIGS. 4A and 4B are schematic drawings showing the construction of the antenna unit.
Figure 4B:
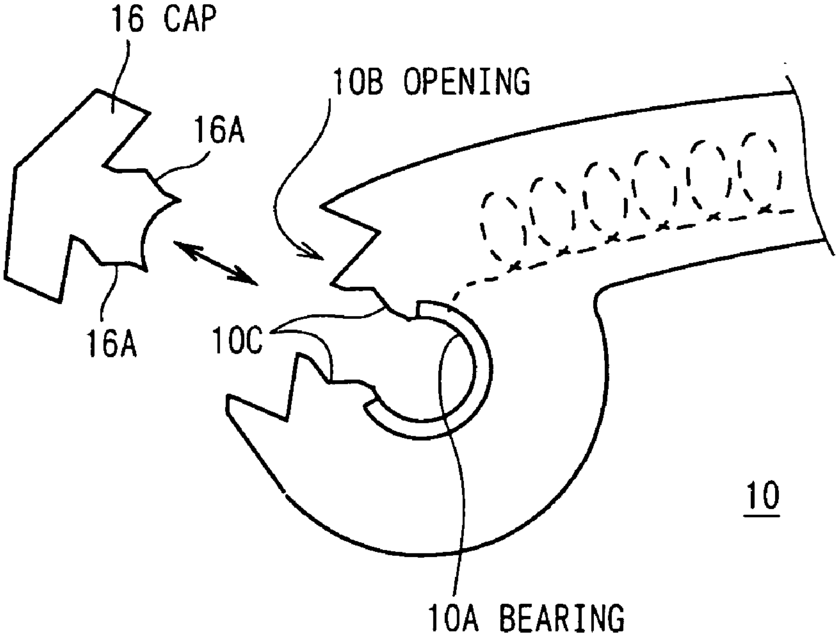

One end of the pivot axis 12 is electrically connected to an antenna feed point 13A of a circuit board 13 via a flexible feed spring 14 made of metal. In addition, as shown in FIG. 4A, an antenna element 18 which is a helical antenna made by making a metal wire spiral is contained in the antenna unit 10 and a flexible metal plate 15 is attached on the inner circumference of the bearing 10A, so that the antenna element 14 is electrically connected to the plate 15.

Therefore, when the pivot axis 12 is inserted into the bearing 10A, the metal plate 15 touches the pivot axis 12, and thereby the antenna element 18 and the antenna feed point 13A (FIG. 3) are electrically connected to each other via the metal plate 15, the pivot axis 12 and the feed spring 14, thus always energizing the antenna element 18 even if the antenna unit 10 is rotated by a desired angle.

In addition to the above construction, the antenna unit 10 has an opening 10B serving as an antenna detachment means, and a cap 16 is fitted to the opening 10B, the opening 10B formed by cutting a part of the bearing 10A serving as an antenna supporting means and the antenna detachment means.

The opening 10B has two concave parts 10C, and the cap 16 has two convex parts 16A so as to fit the corresponding concave parts 10C. Proper controlling of a force for fitting of the parts 16A and 10C does not allow the cap 16 to come off easily.

(3) Detachment and Attachment of Antenna Unit

Figure 5A:
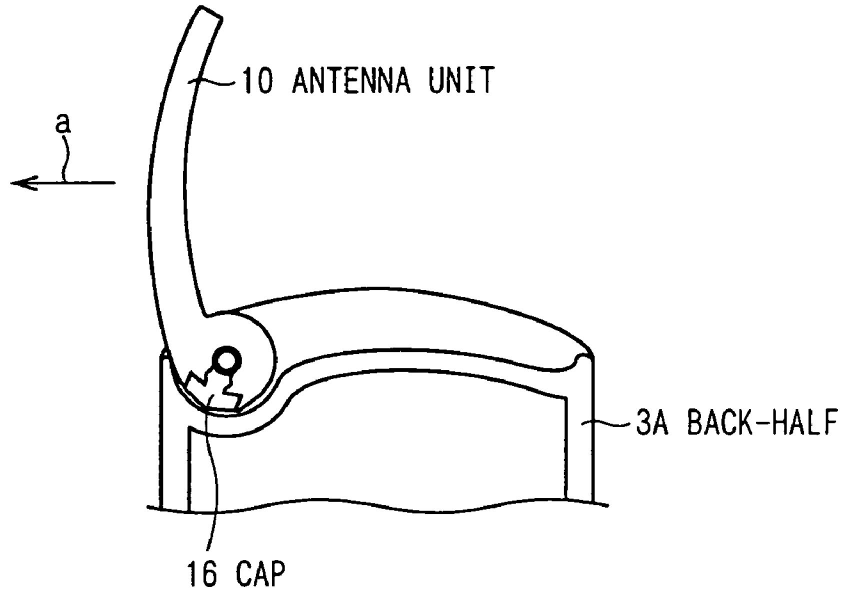
FIGS. 5A and 5B are schematic drawings showing detachment of the antenna unit.
Figure 5B:
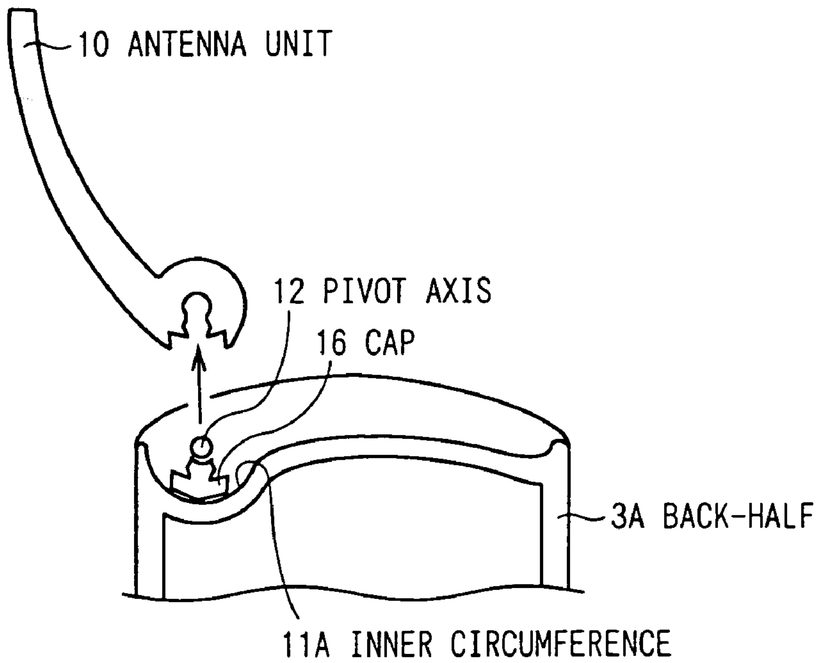

As described above, the antenna unit 10 of the portable telephone 1 has the opening 10B, and the cap 16 is fitted to the opening 10B. When an excessive external force is applied to the antenna unit 20 being in the upright position as shown in FIG. 5A, the opening 10B is widened, thereby allowing the antenna unit 10 to come off the portable telephone 1 as shown in FIG. 5B. In this case, the fitting between the opening 10B and the cap 16 is separated and the bearing 10A comes off the pivot axis 12. The excessive external force, which is over the predetermined threshold set by the usual operation of the antenna unit 10, includes such a force as to rotate the antenna unit further (a direction shown by an arrow a), an excessive force toward a width direction, and a shock due to falling of the portable telephone 1.

As a result, the antenna unit 10, the pivot axis 12, the keypad housing 3 and so on can be prevented from being broken. At this time, the cap 16 is sandwiched between the pivot axis 12 and the inner circumference 11A of the groove 11 such that it does not easily come off the portable telephone 1.

Figure 6A:
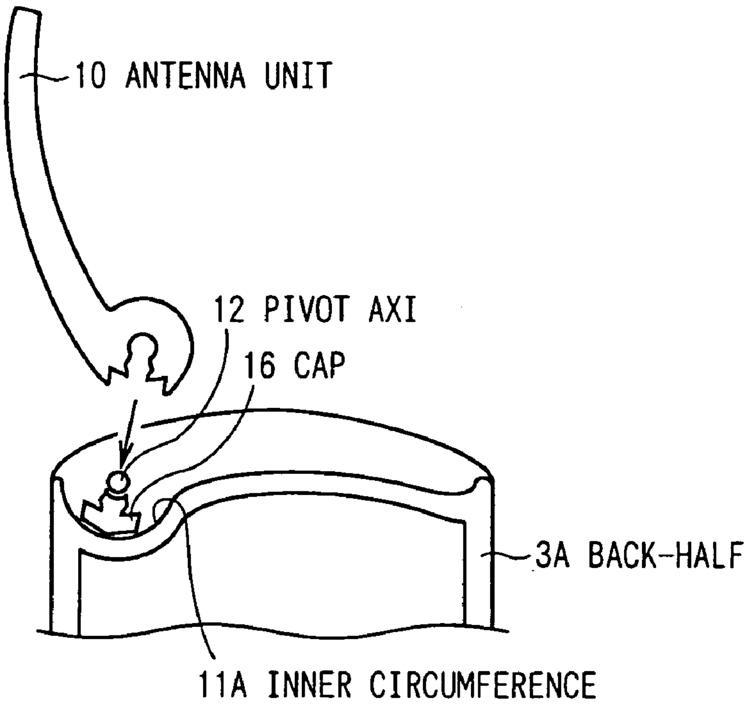
FIGS. 6A and 6B are schematic drawings showing attachment of the antenna unit.
Figure 6B:
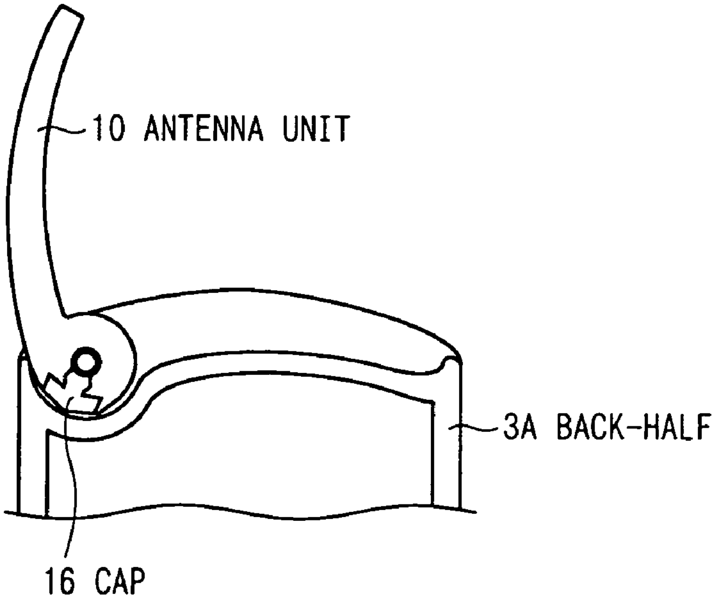

To re-attach the antenna unit 10, face the opening 10B to the cap 16 as shown in FIG. 6A and then push the antenna unit 10 toward the pivot axis 12, with the result that the cap 16 fits the opening 10B and the bearing 10A holds the pivot axis 12 (FIG. 6B).

It should be noted that proper force necessary for the above-mentioned detachment or re-attachment of the antenna unit 10 can be adjusted, as desired, by changing the shapes of the concave parts 10C and the convex parts 16A.

(4) Other Embodiments

The foregoing embodiment has dealt with the case where the helical antenna is contained as the antenna element 14 in the antenna unit 10. This invention, however, is not limited to this and various antenna elements can be applied, such as a board having a meandering conductive pattern thereon or an uneven metal plate.

Further, the foregoing embodiment has dealt with the case where the opening 10B is formed by cutting a part of the bearing 10A and the cap 16 is fitted to the opening 10B. This invention, however, is not limited to this and the cap 16 can be omitted, provided that the opening 10 is formed so that the pivot axis 12 can be surely supported by only the bearing 10A.

Still further, the foregoing embodiment has dealt with the case where the present invention is applied to the portable telephone 1 composed of the display housing 2 and the keypad housing 3. This invention, however, is not limited to this and can be applied to various kinds of portable wireless device such as a portable telephone in which a display and an keypad area are arranged on one housing.

While there has been described in connection with the preferred embodiments of the invention, it will be obvious to those skilled in the art that various changes and modifications may be aimed, therefore, to cover in the appended claims all such changes and modifications as to fall within the true spirit and scope of the invention.

What is claimed is:

1. An antenna unit rotatably attached to a housing of a portable wireless device:

the antenna unit configured to be rotated away from and folded into the housing, the antenna unit comprising antenna supporting means for rotatably supporting said antenna unit on said housing, said antenna supporting means comprising antenna detachment means for allowing said antenna unit to detach from said housing when an excessive external force is applied to the antenna unit while the antenna unit is rotated away from the housing, said antenna detachment means comprising a bearing for rotatably supporting said antenna unit on said housing by inserting a pivot axis mounted on the housing therein and holding the pivot axis; and an opening formed by partially cutting said bearing wherein, when the excessive external force is applied to said antenna unit, said opening is widened, so that said pivot axis is released from said bearing and the antenna unit detaches from the housing.

2. The antenna unit according to claim 1, further comprising a cap to fit said opening, wherein, when the excessive external force is applied to said antenna unit, said opening is widened, so that the opening and the cap are separated.

3. The antenna unit according to claim 2, wherein said cap is sandwiched between said pivot axis and said housing while said antenna unit is detached.

4. A portable wireless device comprising:

a housing; and an antenna unit capable of being rotated away from and folded into said housing, said antenna unit comprising antenna supporting means for rotatably supporting the antenna unit on said housing including detachment means for allowing said antenna unit to detach from the housing when an excessive external force is applied to the antenna unit while the antenna unit is rotated away from the housing, said antenna detachment means comprising a bearing for rotatably supporting said antenna unit on said housing by inserting a pivot axis mounted on the housing therein and holding the pivot axis; and an opening formed by partially cutting said bearing; wherein, when the excessive external force is applied to said antenna unit, said opening is widened, so that said pivot axis is released from said bearing and the antenna unit detaches from the housing.

5. The portable wireless device according to claim 4, further comprising a cap to fit said opening, wherein, when the excessive external force is applied to said antenna unit, said opening is widened, so that the opening and the cap are separated.

6. The portable wireless device according to claim 5, wherein said cap is sandwiched between said pivot axis and said housing while said antenna unit is detached.

7. A portable wireless device comprising:

a housing; and an antenna unit capable of being rotated away from and folded into said housing, said antenna unit comprising an antenna section containing an antenna element;

a supporting section provided at one end of said antenna section for rotatably supporting said antenna unit on the housing by inserting a pivot axis mounted on the housing therein and holding the pivot axis; and an opening formed by partially cutting said supporting section so that said antenna unit and said supporting section detach from said housing when an excessive external force is applied to the antenna unit or the housing while the antenna unit is rotated away from the housing.

* * * * *